United States Patent [19]
Katoh et al.

[11] Patent Number: 5,343,029
[45] Date of Patent: Aug. 30, 1994

[54] OPTICAL SCANNER HAVING LASER DIODE AS LIGHT SOURCE

[75] Inventors: Hiroaki Katoh; Toshimasa Miyazaki, both of Kawasaki; Tamotsu Takahashi, Tokyo; Takeshi Ishii, Tokyo; Yoshihiro Oyama, Tokyo; Tatsuo Sasaki, Tokyo, all of Japan Sasaki, Tokyo, all of Japan

[73] Assignees: Fujitsu Ltd., Kawasaki; Copal Co. Ltd, Tokyo, both of Japan

[21] Appl. No.: 873,028

[22] Filed: Apr. 24, 1992

[30] Foreign Application Priority Data

Apr. 26, 1991 [JP]  Japan ................................. 3-097408

[51] Int. Cl.⁵ .............................................. G06K 7/10
[52] U.S. Cl. ...................... 235/467; 362/373; 361/694; 359/216
[58] Field of Search .............. 235/462, 467; 362/373, 362/259, 35; 361/384; 353/379, 52, 56, 98, 99; 359/212-221

[56] References Cited

U.S. PATENT DOCUMENTS

| | | | |
|---|---|---|---|
| 2,614,458 | 10/1952 | Critoph et al. | 353/56 |
| 3,126,785 | 3/1964 | Zillmer | 353/56 |
| 3,772,464 | 11/1973 | Chan et al. | 359/218 |
| 4,605,992 | 8/1986 | Cover | 362/373 |
| 4,673,804 | 6/1987 | Filauro | 235/462 |
| 4,701,674 | 10/1987 | Oono et al. | 235/462 |
| 4,729,076 | 3/1988 | Masami et al. | 362/373 |
| 5,000,529 | 3/1991 | Katoh et al. | 359/216 |
| 5,034,866 | 7/1991 | Pujol | 362/373 |
| 5,039,184 | 8/1991 | Murakawa | 359/216 |
| 5,111,367 | 5/1992 | Churchill | 362/373 |

Primary Examiner—E. Rollins Cross
Assistant Examiner—Erick Solis
Attorney, Agent, or Firm—Staas & Halsey

[57] ABSTRACT

An optical scanner includes a light source including a laser diode for emitting a laser beam, and an optical deflector such as a rotary polygonal mirror for deflecting the laser beam to thereby produce a scanning laser beam. The laser diode is protected from being overheated by arranging the light source in a heat insulating chamber or by cooling the light source with the air flow circulated by the rotation of the rotary polygonal mirror in cooperation with a curved guide plate.

14 Claims, 6 Drawing Sheets

OPTICAL SCANNER HAVING LASER DIODE AS LIGHT SOURCE

BACKGROUND OF THE INVENTION

1. Field of the Invention

The present invention relates to an optical scanner for scanning an object with a laser beam, and more particularly, to such an optical scanner having a laser diode as a light source.

2. Description of the Related Art

Optical scanners are widely used in various optical devices, such as, for example, bar code readers forming a part of a POS (Point of Sales) system, electrophotographic laser printers, and optical measurement instruments, etc. In general, such optical scanners comprise a light source for generating a laser, a collimator lens system for shaping the laser into a beam, and an optical deflection system for deflecting the laser beam to scan an object with the deflected laser beam. Conventionally, in such an optical scanner, a gas laser tube is used as the light source, but recently laser diodes have become more widely used than gas lasers, because laser diodes are inexpensive in comparison with gas lasers. Also, rotary polygonal mirrors are respresentative of the optical deflection systems for such scanners, and such mirrors are rotated by suitable electric motors to deflect the laser beams incident thereon, to produce scanning laser beams.

In the optical devices as mentioned above, the optical scanner is housed in an enclosed housing together with the motor for the polygonal mirror, a control circuit board for the optical device, and other components. During operation of the optical device, the temperature inside the housing is raised due to heat generated by the motor and the control circuit board. Gas laser tubes can endure a relatively high temperature, but laser diodes are sensitive to such a relatively high temperature. Especially, laser diodes which generate a visual laser having a wavelength of less than 670 nm, are very sensitive to a temperature of more than 50 degrees. When laser diodes are subjected to ambient air having a temperature of more than 50 degrees, they are quickly deteriorated or are subject to breakage. Accordingly, in optical scanners having a laser diode as the light source, the laser diode must be protected from being overheated before the optical scanner can be properly operated over a long period.

SUMMARY OF THE INVENTION

Therefore, an object of the present invention is to provide an optical scanner having a laser diode as a light source, which is arranged such that the laser diode is effectively protected from being overheated, whereby the operational life of the optical scanner can be prolonged.

In accordance with the present invention, there is provided an optical scanner comprising: a light source including a laser diode for emitting a laser beam; an optical deflector for deflecting the laser beam to thereby produce a scanning laser beam; and a protection means for protecting the laser diode of the light source from being overheated.

In accordance with an aspect of the present invention, the protection means comprises a partition wall for defining a heat insulating chamber in which the light source means is located. The partition wall has a hole therein through which the laser beam emitted from the light source passes, and an annular sealing element is provided between the portion of the partition wall surrounding the hole and an end face of the light source from which the laser beam is emitted.

The partition wall may have a double-walled construction including inner and outer partition walls which define the heat insulating chamber. In this case, the respective partition walls have holes formed therein, which are aligned with each other so that the laser beam can pass through both holes, a first annular seal element is provided between a wall surface portion of the inner partition wall surrounding the hole formed therein and an end face of the light source unit from which the laser beam is emitted, and a second annular seal element is provided between the inner and outer partition walls, to surround the holes formed therein, respectively.

To define the heat insulating chamber, the partition walls may be associated with a part of a housing in which the light source and the optical deflector are housed. In this case, the housing may have at least one vent hole for communicating the heat insulating chamber with the outside, and a prevention means may be provided in the heat insulating chamber to prevent an occurrence of electrostatic discharge which might break the laser diode of the light source.

In accordance with another aspect of the prevent invention, the optical deflector comprises a rotary polygonal mirror and an electric motor for driving the rotary polygonal mirror. In this case, the protection means may comprise a curved guide plate member disposed along half of the periphery of the rotary polygonal mirror, whereby the laser diode of the light source is exposed to and cooled by the air flow circulated in the housing by rotation of the rotary polygonal mirror associated with the guide plate member. Preferably, the housing for the light source and the optical deflector is divided into two chambers by a heat insulating partition, so that the light source and the polygonal mirror are housed in one of the chambers and the electric motor is housed in the other chamber.

BRIEF DESCRIPTION OF THE DRAWINGS

Other objects and advantages of the present invention will be better understood from the following description, with reference to the accompanying drawings, in which.

DESCRIPTION OF THE PREFERRED EMBODIMENTS

Figure 1:
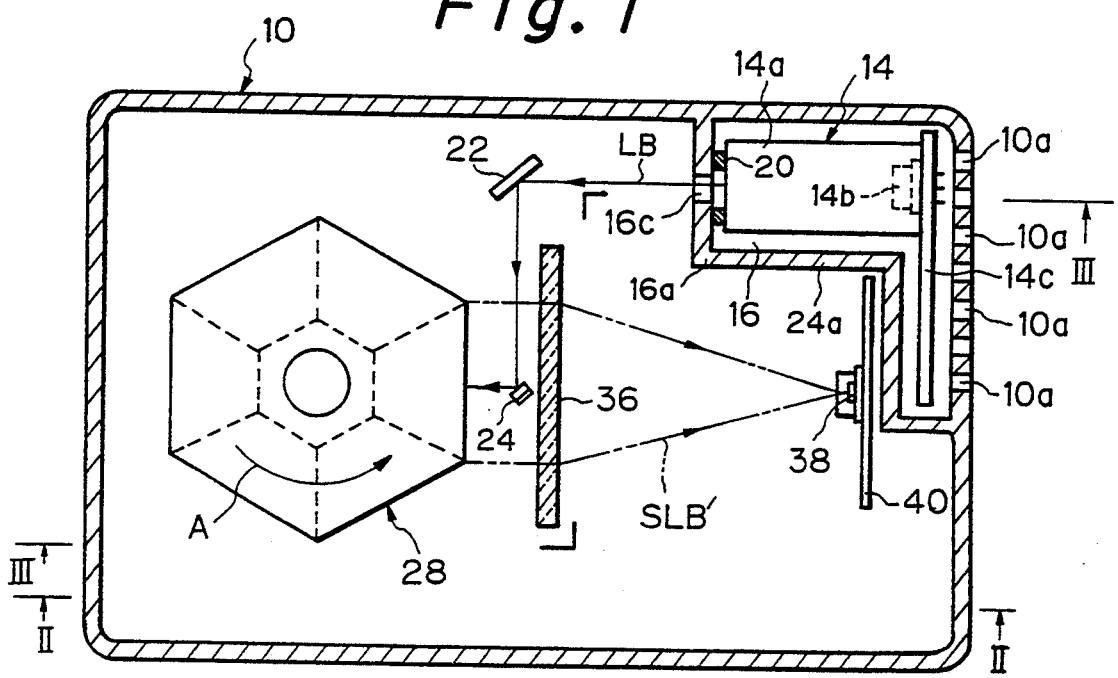
FIG. 1 is a cross sectional view, taken along line I—I of FIG. 2, showing a bar code reader in which a first embodiment of an optical scanner according to the present invention is incorporated.
Figure 2:
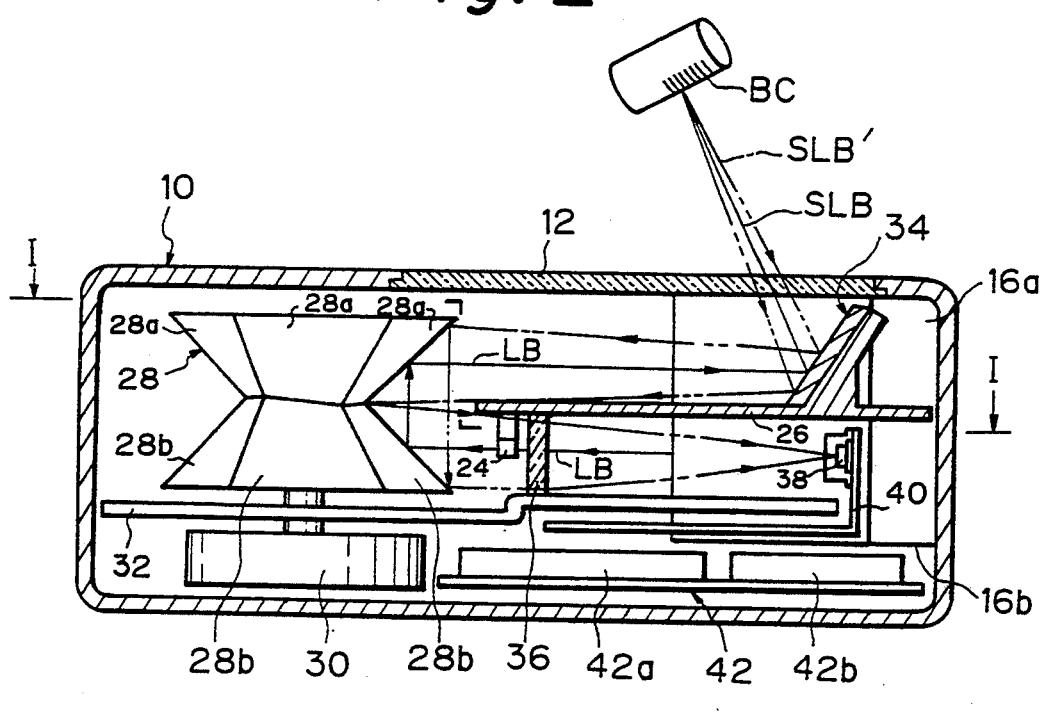
FIG. 2 is a cross sectional view taken along line II—II of FIG. 1.
Figure 3:
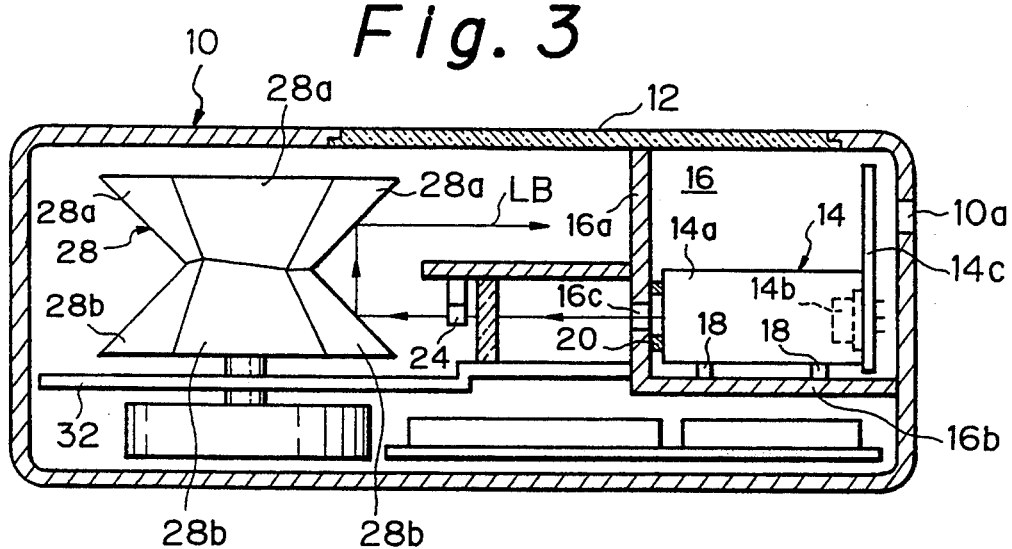
FIG. 3 is a cross sectional view taken along line III—III of FIG. 1.

FIGS. 1 to 5 show a first embodiment of an optical scanner according to the present invention, which is incorporated in a bar code reader for use in a POS system. The bar code reader includes a box-like housing 10, which may be made of a suitable synthetic resin exhibiting a heat insulating property, such as a polyvinyl chloride resin. As shown in FIGS. 2 and 3, the housing 10 has a transparent window 12 formed in one of the walls thereof and made of a transparent glass material. A scanning laser beam SLB is projected through the transparent window 12 to read information of a bar code BC attached to an article. The beam SLB is obtained from an optical scanner constructed according to the present invention and housed in the housing 10.

Figure 5:
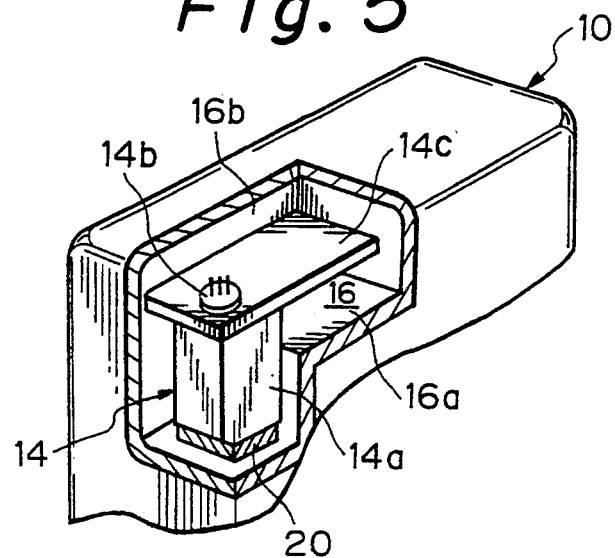
FIG. 5 is a partial perspective view of the bar code reader of FIG. 1.

The optical scanner comprises a light source unit 14 including a casing 14a, a laser diode 14b disposed at one end thereof for generating a laser, a collimator lens system (not shown) housed in the casing 14a for shaping the laser into a beam, and a heat sink 14c attached to the laser diode 14b to allow an escape of heat generated therein. As best shown in FIG. 5, the light source unit 14 is disposed in a heat insulating chamber 16 defined and partitioned by partition walls 16a and 16b at one corner of the box-like housing 10. Similar to the housing 10, the partition walls 16a and 16b are made of a suitable synthetic resin exhibiting a heat insulating property, and the same preferably are formed integrally with the housing 10. The light source unit 14 is mounted on the partition wall 24b by spacer elements 18, as shown in FIG. 3. As shown in FIGS. 1 and 3, a laser beam LB emitted from the light source unit 14 passes through a hole 16c formed in the partition wall 16a. An annular sealing element 20, which is preferably formed of a sponge material, is provided between a wall surface portion of the partition wall 16a surrounding the hole 16c and an end face of the light source unit 14 from which the laser beam LB is emitted.

In this embodiment, the optical scanner also comprises a first mirror element 22 and a second mirror element 24 supported by a frame plate member 26 extending from the partition wall 16a. The first mirror element 22 is disposed so that a reflecting face thereof defines an angle of 45 degrees with the laser beam LB emitted from the light emitting unit 14, and the second mirror element 24 is disposed so that the reflecting face thereof defines an angle of 45 degrees with the laser beam LB reflected by the first mirror element 22.

Figure 4:
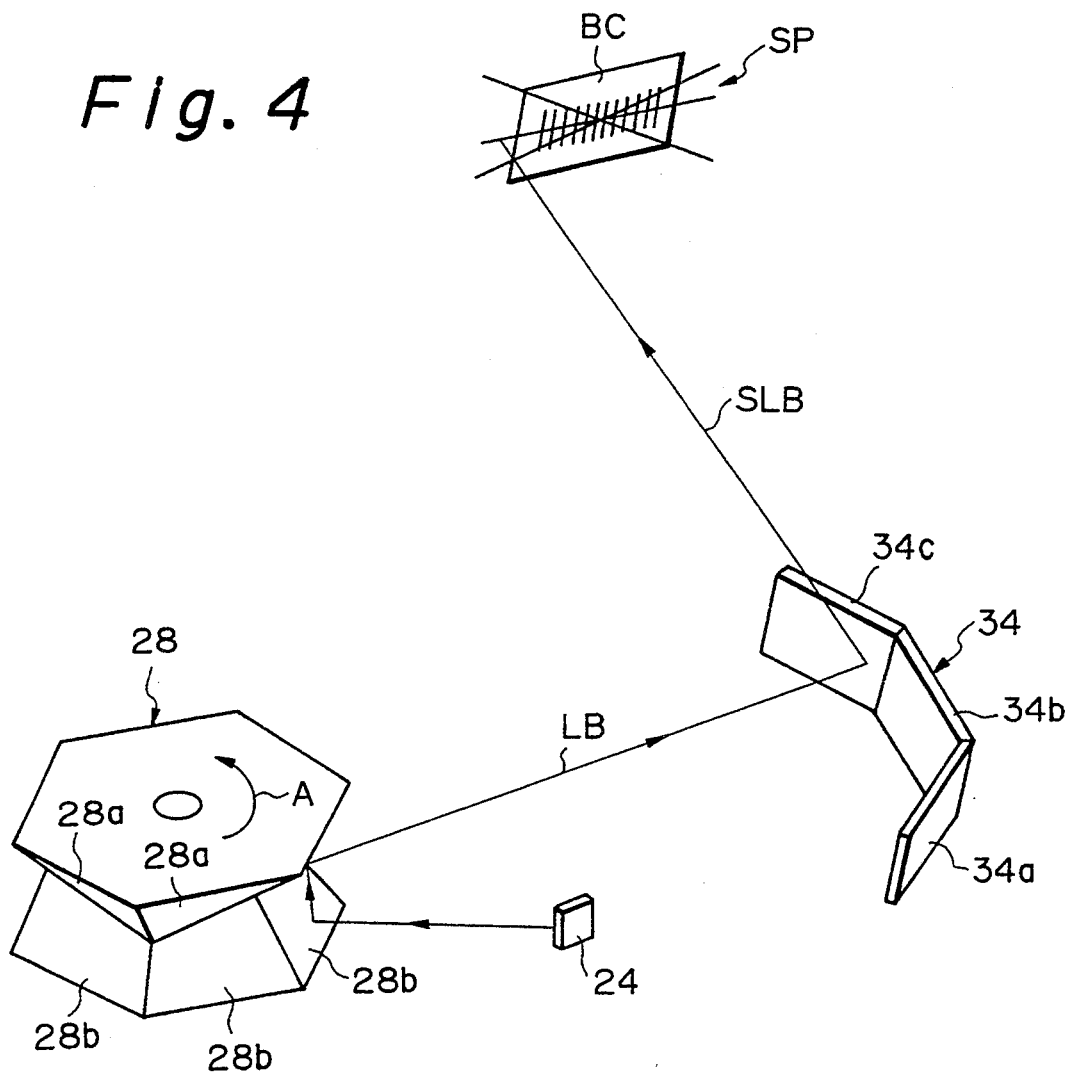
FIG. 4 is a perspective view of a mirror element, a rotary polygonal mirror, and a reflector assembly included in the optical scanner of FIG. 1.

The optical scanner further comprises a rotary polygonal mirror 28 attached to an output shaft of a suitable electric motor 30 supported by a frame plate 32 provided within the housing 10. The rotary polygonal mirror 28 is disposed to receive the laser beam LB reflected by the second mirror element 24, and is rotated in a direction indicated by an arrow A during operation of the bar code reader, as shown in FIGS. 1 and 4. The rotary polygonal mirror 28 is provided with a plurality of reflecting faces 28a and 28b, which are specifically arranged, as disposed in U.S. Pat. No. 5,000,529 issued on Mar. 19, 1991. The reflecting faces 28a and 28b have different inclination angles from each other with respect to a rotational axis of the polygonal mirror 28, such that the laser beam LB is deflected so as to repeatedly describe a given scanning pattern, as set forth in detail hereinafter.

The optical scanner also comprises a reflector assembly 34 disposed on the frame plate member 26 and including three reflectors 34a, 34b, and 34c which are arranged to cooperate with the rotary polygonal mirror 28 so that the laser beam LB reflected thereby is projected, as the scanning laser beam SLB, through the transparent window 12. Due to the specific arrangement of the reflecting faces 28a and 28b of the rotary polygonal mirror 28, the scanning laser beam SLB is deflected so as to repeatedly describe a scanning pattern SP consisting of three line segments which intersect with each other.

When the bar code BC is scanned with the scanning laser beam SLB, this beam is scattered as a light signal. A portion of the scattered light (i.e., the light signal), indicated by SLB' in FIG. 2, is returned to the reflector assembly 34, and is then directed to a focussing lens element, such as a Fresnel lens 36, through the reflecting faces 28a, 28b of the rotary polygonal mirror 28. By the focussing lens element 36, the light signal is focussed on a photosensor 38, and is thus detected. As shown in FIG. 2, the focussing lens element 36 is disposed between and supported by the frame plate member 26 and the frame plate 32, and the photosensor 38 is supported by a suitable plate member 40.

The bar code reader includes a printed circuit board 42 having a controller circuit 42a for controlling the operation of the bar code reader and a processor circuit 42b for processing the light signal detected by the photosensor 26. In FIGS. 2 and 3, the controller circuit 42a and the processor circuit 42b are symbolically shown as rectangular boxes.

The polygonal mirror 28 having the specific arrangement of the reflecting faces 28a and 28b as disclosed in the above-mentioned U.S. patent, enables a reduction of the overall size of the optical scanner, and therefore, of the bar code reader. For example, the optical scanner can be housed in a box-like housing (10) having a size of 18×12×16 cm. Accordingly, the temperature of the interior of the housing 10 can be easily raised because of the heat generated by the electric motor 30 and by the printed circuit board 42. Nevertheless, according to this embodiment of the present invention, the laser diode 14b of the light source unit 14 can be protected from overheating because the light source unit 14 is housed in the heat insulating chamber 16. Also, since the light source unit 14 is mounted on the parittion wall 16b by the spacer elements 18, the transfer of heat from the housing interior to the light source unit 14 can be effectively suppressed. When the heating insulating chamber 16 does not have a capacity sufficient to keep the interior temperature thereof at a low level, i.e., when heat cannot sufficiently escape from the interior of the heat insulating chamber 16 through a wall portion of the housing 10 by which the chamber 16 is partly defined, such wall portion may preferably be provided with a plurality of vent holes 10a formed therein to communicate the heat insulating chamber 16 with the outside as shown in FIGS. 1 and 3.

Figure 6:
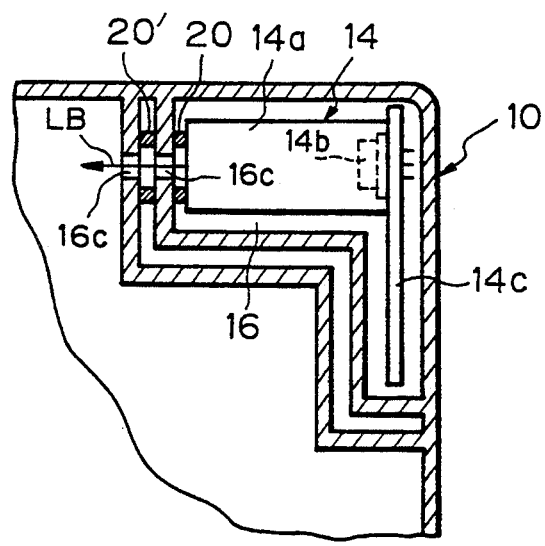
FIG. 6 is a partial cross sectional view corresponding to a portion of FIG. 1, showing a first modification of the embodiment of FIGS. 1 to 5.

FIG. 6 shows a first modification of the above-mentioned embodiment. As shown in FIG. 6, the heat insulating chamber 16 is defined by a double-walled construction including two partition walls. The respective partition walls have holes 16c and 16c' formed therein and which are aligned with each other so that the laser beam LB can be passed through both of the holes 16c and 16c'. Similar to the first embodiment, an annular seal element 20 is provided between a wall surface portion of the inner partition wall surrounding the hole 16c and an end face of the light source unit 14 from which the laser beam LB is emitted. Further, an additional annular seal element 20' is provided between the inner and outer partition walls and surrounding the holes 16c and 16c'. As illustrated, since an air space is formed between the inner and outer partition walls, the chamber 16 can be more effectively insulated from the interior of the housing 10.

Figure 7A:
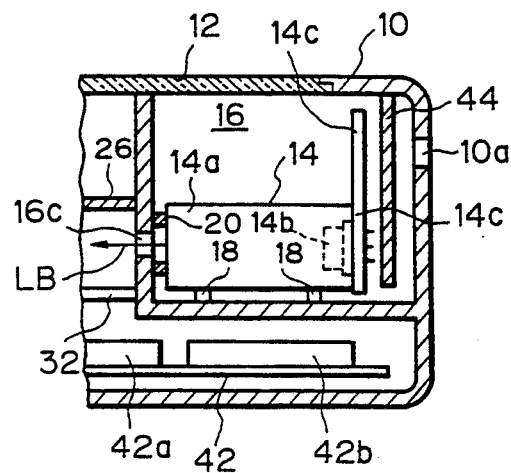
FIGS. 7A and 7B are partial cross sectional views corresponding to portions of FIGS. 3 and 1, respectively and showing a second modification of the embodiment of FIGS. 1 to 5.
Figure 7B:
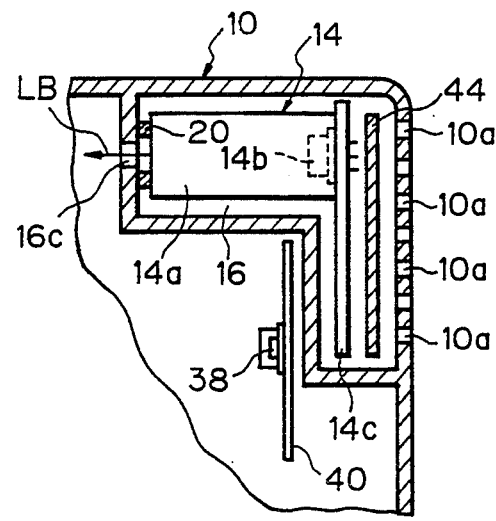

FIGS. 7A and 7B show a second modification of the embodiment of FIGS. 1 to 5. In this second modification, a shield plate element 44 is provided in the heat insulating chamber 16 and is disposed between the heat sink 14c and a wall portion of the housing 10 in which the vent holes 10a are formed, so that the creepage distance measured from the vent holes 10a to the laser diode 14b is lengthened, whereby the occurrence of an electrostatic discharge by which the laser diode 14c might be broken can be prevented. As shown in FIG. 7A, the shield plate element 44 is supported by an inner wall of the housing 10 and in cantilever manner.

Figure 8A:
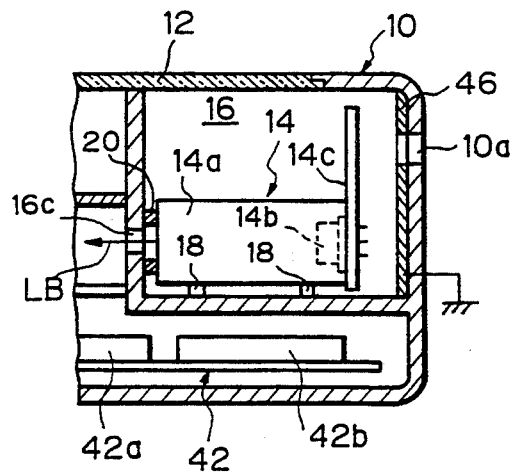
FIGS. 8A and 8B are partial cross sectional views corresponding to portions of FIGS. 3 and 1, respectively and showing a third modification of the embodiment of FIGS. 1 to 5.
Figure 8B:
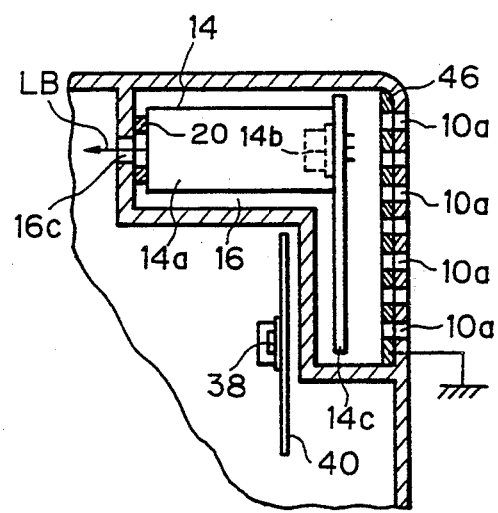

FIGS. 8A and 8B show a third modification of the embodiment of FIGS. 1 to 5. In this third modification, to prevent an occurrence of electrostatic discharge by which the laser diode 14c might be broken, an electrode layer 46 is applied to an inner surface of the wall portion of the housing 10 in which the vent holes 10a are formed, and layer 46 is grounded as shown in FIGS. 8A and 8B.

Figure 9:
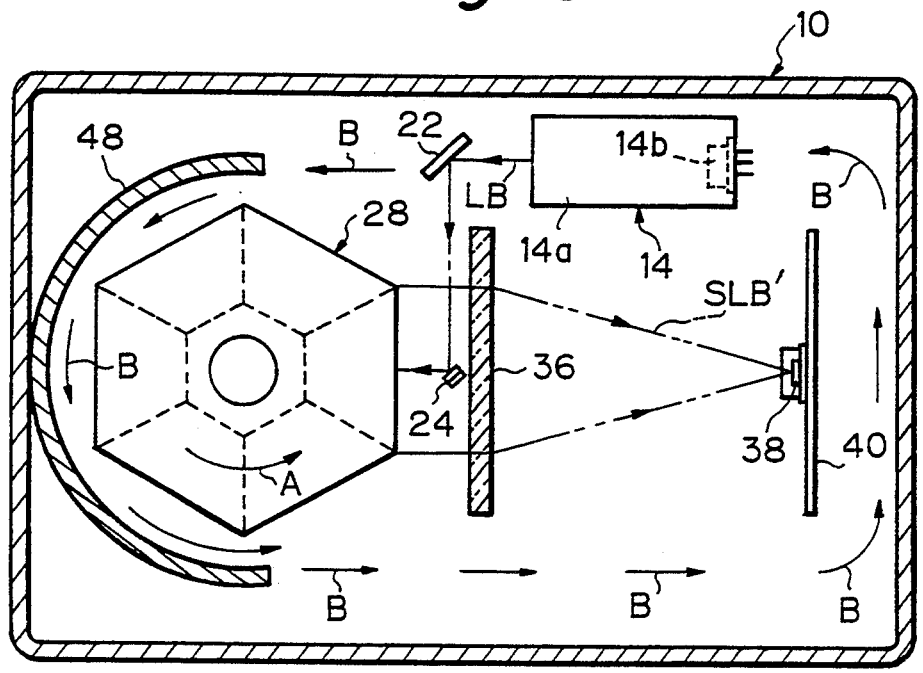
FIGS. 9 and 10 are views similar to FIGS. 1 and 2, showing a second embodiment of an optical scanner according to the present invention.
Figure 10:
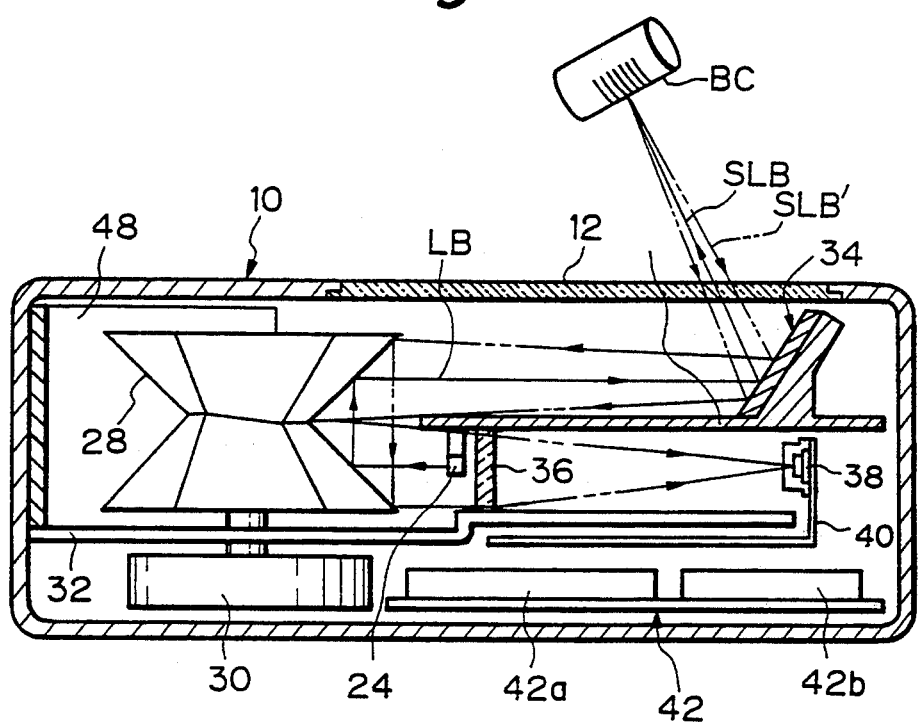

FIGS. 9 and 10 show a second embodiment of the optical scanner according to the present invention. Similar to the first embodiment shown in FIGS. 1 to 5, the optical scanner of FIGS. 9 and 10 is also incorporated in a bar code reader. In FIGS. 9 and 10, features similar to those of FIGS. 1 to 5 are indicated by the same reference numerals. In this second embodiment, the light source unit 14 is mounted directly in the interior of the housing 10, but is exposed to an air flow circulated by rotation of the rotary polygonal mirror 28 in the housing 10. As shown in FIGS. 9 and 10, a curved guide plate member 48 is disposed along a half periphery of the rotary polygonal mirror 28, so that a positive circulation of air flow is caused by the rotation of the polygonal mirror 28 in the housing 10, as indicated by arrows B in FIG. 9, and thus, the laser diode 14b of the light source 14 is cooled by the circulated air flow, and is thus protected from being overheated. As disclosed in Unexamined Japanese Patent Publication No. 3(1991)-17611, a windage loss can be reduced by providing a guide plate along a polygonal mirror. Accordingly, in the second embodiment, the amount of heat generated by the electric motor 30 for the polygonal mirror 28 is smaller than in the first embodiment shown in FIGS. 1 to 5.

Figure 11:
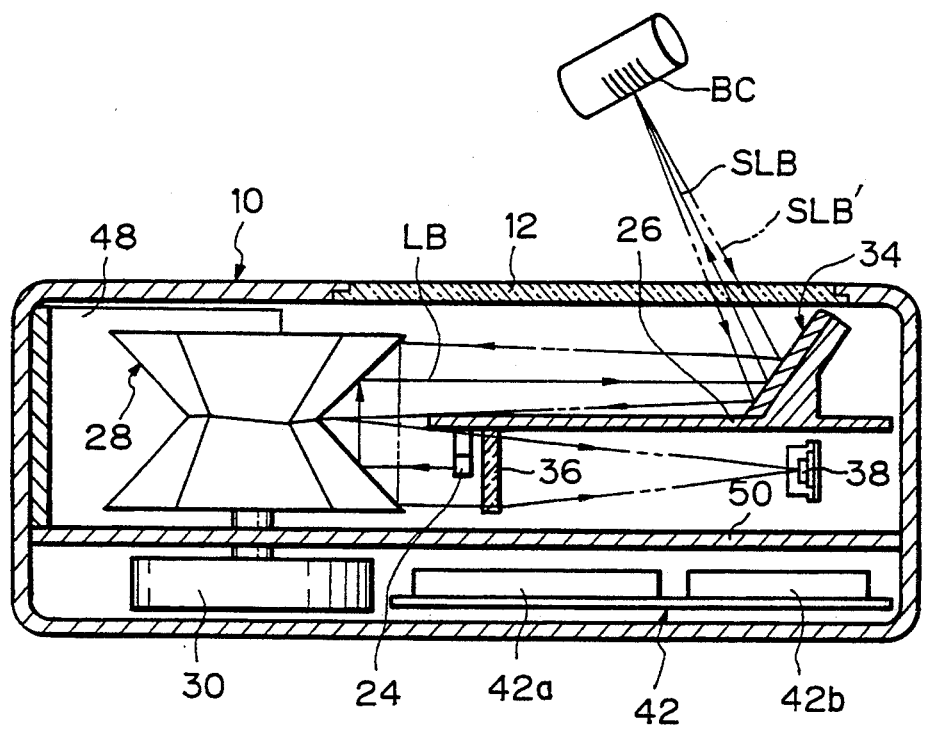
FIG. 11 is a view similar to FIG. 10, showing a modification of the second embodiment shown in FIGS. 9 and 10.

FIG. 11 shows a modification of the second embodiment of FIGS. 9 and 10. In this modified embodiment, the interior of the housing 10 is divided into two chambers by a heat insulating partition 50, which may be made of the same material as the housing 10. One such chamber houses the electric motor 30 and the printed circuit board 42 by which heat is generated, and the other chamber houses the optical scanner and other elements associated therewith. With this arrangement, the laser diode of the light source unit can be effectively protected from being overheated.

Although the optical scanner according to the present invention is explained in association with a bar code reader in the above-mentioned embodiments, the present invention can be, of course, applied to other devices, such as, for example, electrophotographic laser printers and optical measurement instruments, etc.

Finally, it will be understood by those skilled in the art that the foregoing description is of preferred embodiments of the present invention, and that various changes and modifications may be made of the present invention without departing from the spirit and scope thereof.

We claim:
1. An optical scanner comprising:
a light source including a laser diode for emitting a laser beam;
an optical deflector for deflecting the laser beam to thereby produce a scanning laser beam;
a protection arrangement for protecting the laser diode of said light source from being overheated, said protection arrangement including a partition wall structure defining a heat insulating chamber in which said light source is located, said partition wall structure including a wall having a hole therein through which the laser beam emitted from said light source passes; and
an annular sealing element provided between a portion of said partition wall surrounding said hole and an end face of said light source from which the laser beam is emitted.

2. An optical scanner comprising:
a light source including a laser diode for emitting a laser beam;
an optical deflector for deflecting the laser beam to thereby produce a scanning laser beam;
a protection arrangement for protecting the laser diode of said light source from being overheated, said protection arrangement including a partition wall structure defining a heat insulating chamber in which said light source is located, said partition wall structure including inner and outer partition walls by which said heat insulating chamber is defined, said partition walls having respective holes formed therein which are aligned with each other so that the laser beam can pass through both holes;
a first annular sealing element provided between a wall surface portion of the inner partition wall surrounding the hole formed therein and an end face of said light source from which the laser beam is emitted; and
a second annular sealing element provided between the inner and outer partition walls and surrounding the respective holes formed therein.

3. An optical scanner comprising:
a light source including a laser diode for emitting laser beam;
an optical deflector including a rotary polygonal mirror for detecting the laser beam to thereby a scanning laser bean; and a protection arrangement including a curved guide plate member disposed along a half periphery of said rotary polygonal mirror such that the laser diode of said light source is exposed to and cooled by an air flow circulated by rotation of said rotary polygonal mirror in cooperation with said guide plate member, whereby the laser diode of said light source is protected from being overheated.

4. An optical scanner comprising:

a housing;

a light source provided in said housing and including a laser diode for emitting a laser beam;

an optical deflector provided in said housing for deflecting the laser beam to thereby produce a scanning laser beam;

a protection arrangement for protecting the laser diode of said light source from being overheated in said housing, said protection arrangement including a partition wall structure associated with a portion of said housing and defining a heat insulating chamber in which said light source is located, said partition wall structure including a wall having a hole therein through which the laser beam emitting from said light source passes; and an annular sealing element provided between a portion of said partition wall surrounding said hole and an end face of said light source from which the laser beam is emitted.

5. An optical scanner as set forth in claim 4, wherein said housing includes at least one vent hole for communicating said heat insulating chamber with the outside.

6. An optical scanner as set forth in claim 4, wherein a discharge prevention structure is provided in said heat insulating chamber to prevent an occurrence of an electrostatic discharge by which the laser diode of said light source might be broken.

7. An optical scanner as set forth in claim 6, wherein said discharge prevention structure comprises a shield plate element for lengthening the creepage distance measured from said vent hole to the laser diode of said light source.

8. An optical scanner as set forth in claim 6, wherein said discharge prevention structure comprises a grounded electrode layer applied to the housing.

9. An optical scanner as set forth in claim 8, wherein said grounded electrode layer is applied to a portion of said housing, said portion of said housing having at least one vent hole for communicating said heat insulating chamber with the outside.

10. An optical scanner comprising:

a housing;

a light source provided in said housing and including a laser diode for emitting a laser beam;

an optical deflector provided in said housing deflecting the laser beam to thereby produce a scanning laser beam;

a protection arrangement for protecting the laser diode of said light source from being overheated in said housing, said protection arrangement including a partition wall structure associated with a portion of said housing and defining a heat insulating chamber in which said light source is located, said partition wall structure including inner and outer partition walls by which said heat insulating chamber is partially defined, said partition walls having respective holes formed therein which are aligned with each other so that the laser beam can pass through both holes;

a first annular sealing element provided between a wall surface portion of the inner partition wall surrounding the hole formed therein and an end face of said light source from which the laser beam is emitted; and a second annular sealing element provided between the inner and outer partition walls and surrounding the respective holes formed therein.

11. An optical scanner comprising:

a housing;

a light source provided in said housing and including a laser diode for emitting a laser beam;

an optical deflector provided in said housing and including a rotary polygonal mirror for deflecting the laser beam to thereby produce a scanning laser beam, and an electric motor for driving said rotary polygonal mirror; and a protection arrangement including a curved guide plate member disposed along a half periphery of said rotary polygonal mirror such that the laser diode of said light source is exposed to and cooled by an air flow circulated in said housing by rotation of said rotary polygonal mirror in cooperation with said guide plate member, whereby the laser diode of said light source is protected from being overheated.

12. An optical scanner as set forth in claim 11, wherein said housing is divided into two chambers by a heat insulating partition, said light source and said polygonal mirror being housed in one of said chambers, and said electric motor being housed in the other of said chambers.

13. An optical scanner comprising:

a light source including a laser diode for emitting a laser beam;

an optical deflector for deflecting the laser beam to thereby produce a scanning laser beam;

a protection arrangement for protecting the laser diode of said light source from being overheated, said protection arrangement including a partition wall structure defining a heat insulating chamber in which said light source is located; and a spacer element mounting said light source on said partition wall structure to suppress transfer of heat from said partition wall to said light source.

14. An optical scanner as set forth in claim 13, wherein said partition wall structure includes a wall having a hole therein through which the laser beam emitted from said light source passes, said scanner including an annular sealing element located between a portion of said partition wall surrounding said hole and an end face of said light source from which the laser beam is emitted.

* * * * *

UNITED STATES PATENT AND TRADEMARK OFFICE
CERTIFICATE OF CORRECTION

PATENT NO. : 5,343,029
DATED : August 30, 1994
INVENTOR(S) : HIROAKI KATOH et al.

It is certified that error appears in the above-indentified patent and that said Letters Patent is hereby corrected as shown below:

Title page [75], Inventors delete "Sasaki, Tokyo, all of Japan".

Column 1, line 25, delete "respresentative" and substitute --representative--.

Column 2, line 28, delete "prevent" and substitute --present--.

Column 6, line 67, between "thereby" and "a" insert --produce--

Column 7, line 54 after "housing" insert --for--.

Signed and Sealed this

Sixteenth Day of May, 1995

Attest:

BRUCE LEHMAN

*Attesting Officer*  *Commissioner of Patents and Trademarks*